INVENTOR.
FREDERICK R. KUEHN
BY
HIS ATTORNEY

United States Patent Office 3,667,750
Patented June 6, 1972

3,667,750
PLASTIC SPRING FEEDER PLATE
Frederick R. Kuehn, Baltimore, Md., assignor to
Koppers Company, Inc.
Filed Nov. 23, 1970, Ser. No. 91,832
Int. Cl. B65h 5/16
U.S. Cl. 271—44 R                             5 Claims

ABSTRACT OF THE DISCLOSURE

A spring feeder plate consists of a synthetic organic solid plastic that is highly resistant to ruptures induced by flexing of the plate during reciprocation of a spring feeder bar in sheet feeding machines. In such machines, paper board sheets are fed from beneath a stack of such sheets by a reciprocating feeder bar which extends across the width of a feed table. The sheets are fed along a substantially horizontal feed path toward adjacent processing machinery. At least one flexible plastic spring feeder plate is mounted on the feeder bar for engaging the trailing edge of each successive bottom sheet as the bar reciprocates.

BACKGROUND OF THE INVENTION

Field of the invention

This invention relates generally to feeding and more particularly to separators of the reciprocating bottom feed type.

Description of the prior art

During the processing of corrugated paperboard, blanks or sheets are formed to be made into various sized containers. The sheets are singly fed into processing machinery where cutting, scoring and printing operations are usually performed. Generally, the sheets are fed from the bottom of the stack by a reciprocating feeder bar which has several flexible spring feeder plates mounted laterally along the bar. The feeder plates have a raised lip portion at their trailing edges for engaging the trailing edge of each sheet. The weight of the stack constantly flexes or loads the feeder plates thereby constantly exposing the plates to varying forces.

Conventional feeder plates are substantially flexible, thin steel plates which have one end rigidly mounted to the feeder bar by screws or the like, and a second end generally inclined upwardly from the bar toward the bottom of the stack. Attached to the second end is a metallic member which forms the raised lip across the width of the feeder plate for engaging the trailing edge of the bottom sheet.

Mounting the spring feeder plates to the feed bar causes high stress concentrations in the plate material adjacent the mounting screws. Constant flexing or bending of the feeder plates occurs as the feeder bar rapidly reciprocates between the table and the bottom of the stack. The flexing causes the stresses in the plates to vary rapidly. For example, a feeding rate of 220 sheets per minute would cause the feeder plates to be flexed 13,200 times per hour. It is not unusual for such feeders to be operated 16 hours per day.

Eventually, this constant flexing causes fatigue in the metal plates and cracks usually occur in the areas of the greatest amount of stress concentration.

Therefore, the metal plates must be frequently replaced to maintain the efficiency of the feeder. Since it is necessary to shut down feeding operations when such replacements are required, the life of the feeder plates becomes an important factor in the satisfactory performance of sheet feeding equipment.

Prior art feeder plates have been improved to extend the service life of the plates. For example, Barnes Pat. 3,409,289 teaches extending feeder plate life by using a clamp overlapping the attached end of the feeder plate. The effect of this improvement was to transfer stresses to other portions of the feeder plate where stress concentrations were not as high. This improvement was beneficial but did not completely overcome the problem.

It can be seen from the foregoing that there is a need for a feeder plate having the desirable feeding characteristics of steel plates but having in addition a greatly extended service life thus reducing time lost due to replacement of fatigued feeder plates as well as savings in replacement costs of the spring feeders.

SUMMARY OF THE INVENTION

Accordingly, the improved spring feeder of the present invention consists of a synthetic organic solid plastic feeder plate having substantially high resistance to rupture induced by flexing of the plate during reciprocation of the feeder bar. An acetal thermoplastic sold under the Du Pont trademark Delrin, (Grade 150) is preferred example of such a feeder plate material. The flexible spring feeder plate has a first end mountable to the feeder bar and a second end inclined upwardly away from the bar and toward the bottom of the stack. This novel spring feeder plate has been shown to exhibit a service life of over ten million flexing cycles.

The second or raised end preferably includes a metallic member which forms a raised lip portion across the width of the feeder plate for engaging the trailing edge of each successive bottom sheet.

The lip portion can consist of a synthetic organic solid plastic in place of the metallic lip portion. In addition, if desired, a unitary feeder plate may be molded to include the lip portion at the second end.

The thickness of the feeder plate may be variable. Such a variable thickness feeder plate may be molded with or without the lip portion since, for example, a metallic lip portion may be desired. The advantage of the variable thickness plate is in the ability to control the area of maximum flexing of the plate and the partial relieving of stress concentrations.

A steel reinforcing plate may be used to "backup" the plastic plate and further reduce fatigue due to constant flexing. Additionally, a reinforcing bar may be placed over the plate at the first or attached end to help in substantially further reducing the high stress concentrations in the area of the plate adjacent the mounting screws.

Advantageously therefore, the service life of spring feeder plates can be substantially extended without forfeiting the desirable characteristics of prior are feeder plates.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

Wherein like parts are marked alike.

Figure 3:
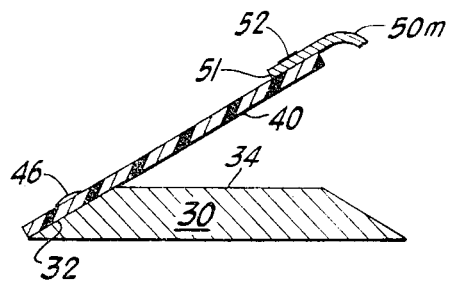
FIG. 3 is a cross-sectional side elevation illustrating the novel plastic feeder plate attached to a feeder bar
Figure 4:
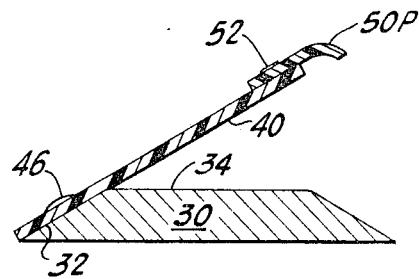
Figure 5:
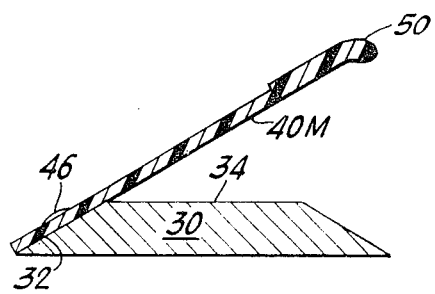
Figure 6:
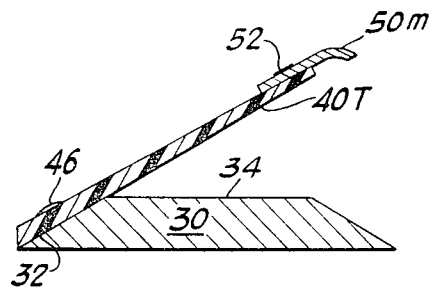
Figure 7:
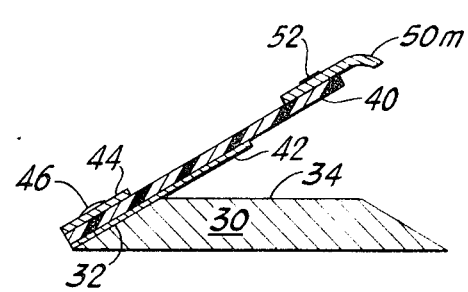

3 and including a metal lip portion for engaging the trailing edge of the bottom sheet of a stack;

FIG. 4 is a cross-sectional side elevation illustrating the plastic feeder plate of FIG. 3 with a plastic lip portion;

FIG. 5 is a cross-sectional side elevation illustrating the plastic feeder plate of FIG. 3 molded to include a lip portion thereby forming a unitary feeder plate;

FIG. 6 is a cross-sectional side elevation illustrating the feeder plate of FIG. 3 modified to provide a variable thickness from the first end to the second end; and FIG. 7 is a cross-sectional side elevation illustrating the plastic feeder plate of FIG. 3 and further including an underlying reinforcing backup plate and an overlying reinforcing bar.

DESCRIPTION OF THE PREFERRED EMBODIMENT

Figure 2:
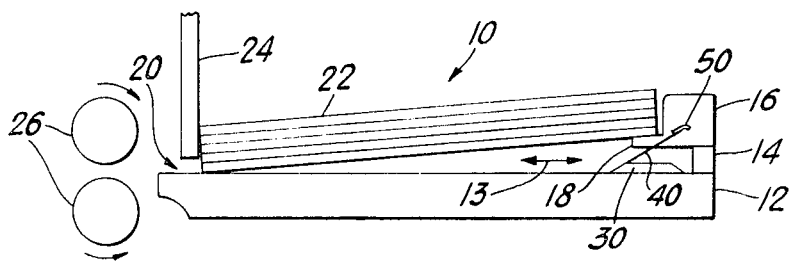
FIG. 2 is a partial side elevation graphically illustrating the usual working environment of a reciprocating bottom sheet feeder.

Referring now to FIG. 2, a sheet feeder generally designated 10 includes feed table 12, backstop support 14 and backstop 16 including ledge support 18. A stack of sheets 22 is supported at its leading edge by feed table 12 and restrained against forward movement by gate 24 which meters the sheets, one at a time, to adjacent processing machinery (not shown). Ledge 18 supports the trailing edge of sheet 22 above the feed table. Bar 30 rapidly reciprocates along feed table 12 in the directions indicated by arrow 13. Feeder plate 40 is mounted to the leading edge of bar 30 and is inclined upwardly toward the bottom of stack 22. The trailing edge of plate 40 includes a raised lip portion 50 which engages the trailing edge of each successive bottom sheet, as bar 30 reciprocates, and urges successive bottom sheets through an opening 20 between gate 24 and the top of feed table 12. As the sheets are individually urged through opening 20, they are engaged by pull rolls 26 which advance the sheets into the adjacent processing machinery (not shown).

Figure 1:
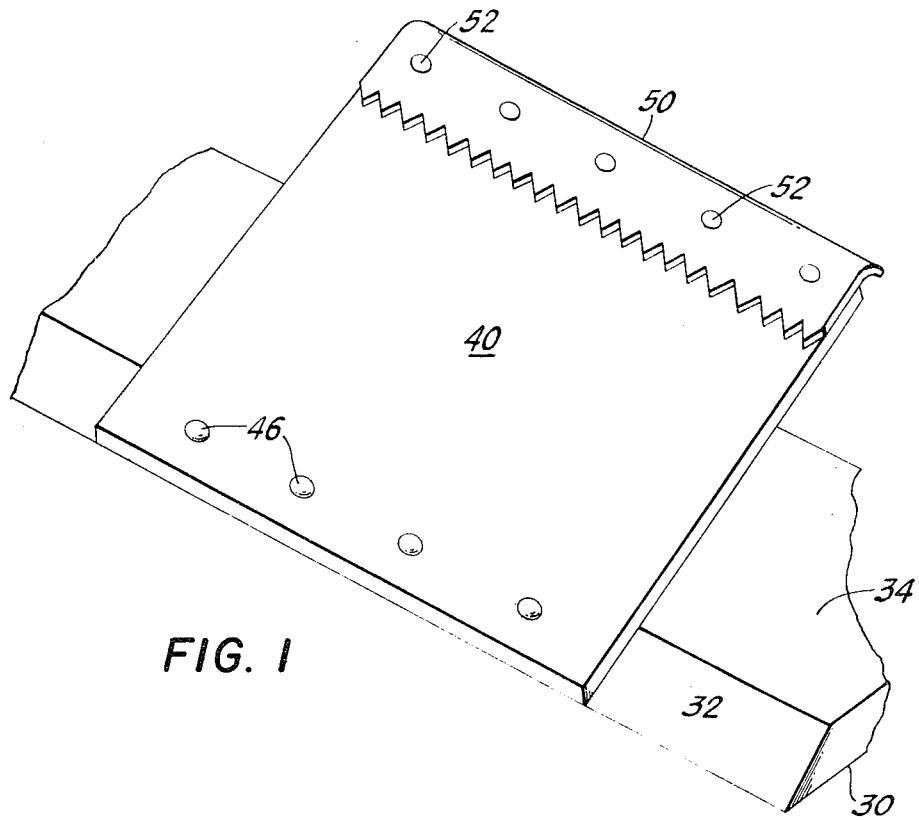
FIG. 1 is a partial perspective view illustrating the mounting of the feeder plate to the feeder bar.

FIG. 1 illustrates a spring feeder plate 40 mounted to the leading edge 32 of feeder bar 30. Leading edge 32 is inclined or bevelled to provide a bearing area for the attachment of feeder plate 40. Therefore, the slope or incline of plate 40 corresponds substantially to the slope of edge 32.

Plate 40 is rigidly mounted to edge 32 by screws 46, or may be attached by other suitable means well-known in the art.

The trailing edge of plate 40 includes a raised lip portion 50 usually extending across the width of plate 40. Rivets 52, or the like, may be used to secure lip 50 to plate 40.

Since the trailing edge of the stack is supported above the feed table, an open area exists beneath the stack which gradually decreases in height as it approaches the point where the feed table supports the leading edge of the stack. The spring feeder bar reciprocates in this open area.

However, as bar 30 rapidly reciprocates beneath stack 22, FIG. 2, plate 40 is flexed rapidly by the weight of the stack as the feeder bar advances into the area of reduced height. This causes stresses in the plate to vary rapidly. Also, increased stress concentrations occur in the plate material adjacent screws 46, see FIG. 1, since the plate tends to flex over the intersection of slope 32 and the upper surface 34. The flexing which varies the stresses causes an aggravation in the plate material, especially in the areas of increased stress concentration. Thus plate 40 experiences varying stress concentration in the areas adjacent screws 46.

FIG. 3 illustrates a feeder plate 40 consisting of a synthetic organic solid plastic, such as Delrin, having substantially high resistance to rupture or cracks due to fatigue induced by the constant rapid flexing of the plate. Plate 40 is secured to leading edge 32 of bar 30 by screws 46 and is inclined upwardly away from bar 30. At the trailing end of plate 40 is a metallic lip portion 50m attached to plate 40 by rivets 52. Other suitable means such as screws or even adhesive may be used to attach lip portion 50m to plate 40. Plate 40 flexes beneath the weight of the stack of sheets 22 as bar 30 reciprocates and edge 51 of lip portion 50m engages the trailing edge of each successive bottom sheet.

FIG. 4 illustrates a feeder plate 40 consisting of a synthetic organic solid plastic such as shown in FIG. 3 but having a lip portion 50p also consisting of the same or similar synthetic organic solid plastic. Lip portion 50p is attached to plate 40 in a manner similar to that described for lip portion 50m in FIG. 3.

Plate 40m, including lip portion 50, can also be molded or extruded into a unitary member, see FIG. 5. Methods of molding plastic articles are well-known in the art; therefore, no discussion of molding techniques is believed necessary. Lip portion 50, being an integral part of plate 40m, in this instance, requires no means for attachment to plate 40m. Screws 46, however, may be used to attach plate 40m to leading edge 32 in the manner previously described.

FIG. 6 shows a tapered feeder plate 40t consisting of a synthetic organic solid plastic having a metallic lip portion 50m attached by rivets 52. Of course, a synthetic organic solid plastic lip portion, similar to 50p in FIG. 4, may be used in place of lip portion 50m if desired. Likewise, tapered plate 40t may be molded or extruded in a similar manner to the feeder plate shown and described in FIG. 5. Tapered plate 40t has a first end, for mounting to leading edge 32, which is substantially thicker than the second end adjacent lip portion 50m. The beneficial effects of uniformly tapered plate 40t between the first and second ends are to disperse the concentrated stresses throughout a greater volume of material thus reducing possible premature ruptures due to fatigue cause by varied stress concentrations, and to control the area of maximum flexing of the plate.

Plate 40 may be reinforced in the mounting area of the plate adjacent leading edge 32 as illustrated in FIG. 7. A metallic backup plate 42 is sandwiched between the first end of feeder plate 40 and leading edge 32 of bar 30. Plate 42 is substantially parallel to plate 40 and extends towards the second end adjacent lip portion 50m; however, plate 42 is shorter in length than plate 40 and therefore terminates at a point between the first and second ends of plate 40. Plate 42 substantially reduces stresses in plate 40 due to flexing since plate 42 acts as a buffer between plate 40 and the point where edge 32 and upper surface 34 of bar 30 intersect; thus plate 42 absorbs some of the flexing load normally induced on plate 40. Furthermore, a flat metallic bar 44 may be placed across the width of the attached end of the plate 40 opposite the bearing area of edge 32 thus sandwiching the attached ends of both plates 40 and 42 between bar 44 and edge 32. Screws 46 are used to secure bar 44, plate 40 and reinforcing plate 42 to edge 32 of bar 30. Bar 44 reduces the movement of plate 40 during flexing in the area adjacent screws 46 thus further reducing the variations imposed on the concentrated stresses located there.

Although FIG. 7 shows feeder plate 40 of substantially uniform thickness, having lip portion 50m as shown in FIG. 3, it should be clearly understood that reinforcing plate 42 and flat bar 44 are not restricted to use with the particular plate shown. For example, plate 42 and bar 44 may be used with any of the plates shown in FIGS. 3 to 7, and also either plate 42 or bar 44 may be used singly with any of the feeder plates shown in FIGS. 3 to 7. If desired, the backup plate 42 and reinforcing plate 44 may be made of a plastic material although metal is preferred.

In operation, a synthetic organic solid plastic spring feeder plate is mounted on a feeder bar for feeding sheets from beneath a stack. The flexible plastic spring feeder plate engages the trailing edge of each successive bottom sheet with a metallic lip portion. If desired, a plastic lip portion may be used in place of the metallic lip portion.

The plastic feeder plate, including a plastic lip portion, may be molded or extruded into a unitary member. Also, the feeder plate may be substantially uniformly tapered between the first end and the second end to disperse the concentrated stresses and to control the area of maximum flexing in the plate. In addition, a reinforcing plate may be sandwiched between the first end of the feeder plate and the bearing area of the feeder bar. The reinforcing plate prevents the feeder plate from bearing directly against portions of the feeder bar, thus reducing stresses in the feeder plate during flexing. Furthermore, a flat bar placed across the width of the first end of the feeder plate, opposite the bearing area of the feeder bar, sandwiches the feeder plate and the reinforcing plate between the flat bar and the bearing area thus reducing the movement of the attached end of the feeder plate and further reducing the concentrated stresses in the feeder plate.

If desired the backup plate 42 and reinforcing bar 44 may be joined to the first end of plate 40, such as by riveting, to form a unitary assembly thereof. The complete assembly may then be secured to bar 30 by screws 46, as shown.

It can be seen from the foregoing that a spring feeder plate can be improved to substantially increase its service life thus overcoming a well-known disadvantage in prior art spring feeders while retaining their advantages.

Having thus described the invention in its best embodiment and mode of operation, that which is desired to be claimed by Letters Patent is:

1. An improved spring feeder for sheet-feeders of the type including a feed table for supporting a stack of sheets thereon and a reciprocating feeder bar having at least one spring feeder mounted thereon, said bar extending across the width of said sheets beneath the stack for advancing successive ones of the bottom sheets of the stack along a substantially horizontal feed path into adjacent processing machinery, the improvement comprising:

a flexible spring feeder plate made of acetal thermoplastic and having a first end mountable to a bevelled surface formed along a leading edge of said feeder bar and a second end inclined upwardly from the first end, said second end including engaging means made of non-acetal thermoplastic secured thereto for engaging the trailing edge of the bottom sheet during advancement of the feeder bar, said feeder plate being highly resistant to rupture induced by flexing of said plate during reciprocation of said bar.

2. An improved spring feeder for sheet-feeders of the type including a feed table for supporting a stack of sheets thereon and a reciprocating feeder bar having at least one spring feeder mounted thereon, said bar extending across the width of said sheets beneath the stack for advancing successive ones of the bottom sheets of the stack along a substantially horizontal feed path into adjacent processing machinery, the improvement comprising:

a flexible spring feeder plate consisting of a synthetic organic solid plastic having a first end mountable to said feeder bar and a second end inclined upwardly from the first end, the first end of said feeder plate tapering substantially uniformly to a lesser thickness at said second end, said second end including engaging means for engaging the trailer edge of the bottom sheet during advancement of the feeder bar, said feeder plate being highly resistant to rupture induced by flexing of said plate during reciprocation of said bar.

3. An improved spring feeder for sheet-feeders of the type including a feed table for supporting a stack of sheets thereon and a reciprocating feeder bar having at least one spring feeder mounted thereon, said bar extending across the width of said sheets beneath the stack for advancing successive ones of the bottom sheets of the stack along a substantially horizontal feed path into adjacent processing machinery, the improvement comprising:

a flexible spring feeder plate consisting of a synthetic organic solid plastic having a first end mountable to said feeder bar and a second end inclined upwardly from the first end, said second end including engaging means for engaging the trailing edge of the bottom sheet during advancement of the feeder bar, and a flexible metallic plate for reinforcing said feeder plate, said metallic plate secured between said first end and said feeder bar in a plane substantially parallel to said feeder plate for reducing bending stresses imposed on said feeder plate, said feeder plate being highly resistant to rupture induced by flexing of said plate during reciprocation of said bar.

4. The improved spring feeder of claim 3 wherein said metallic plate is substantially the same width as said first end and extends from said first end toward said second end but terminates at a point between said first and second ends.

5. The improved spring feeder of claim 4 further including a substantially flat metallic bar secured to the top of the first end of said plate for sandwiching both said first end and said metallic plate between said flat metallic bar and said feeder bar, thus substantially further reducing said bending stresses imposed on said feeder plate.

References Cited

UNITED STATES PATENTS

| | | | |
|---|---|---|---|
| 3,409,289 | 11/1968 | Barnes | 271—44 R |
| 3,006,276 | 10/1961 | Deslauriers et al. | 271—44 R X |
| 580,111 | 4/1897 | Jacobs | 271—44 R UX |

JOSEPH WEGBREIT, Primary Examiner